(12) United States Patent
Chang et al.

(10) Patent No.: US 7,567,888 B2
(45) Date of Patent: Jul. 28, 2009

(54) METHOD FOR EVALUATING AND OPTIMIZING PERFORMANCE OF CHILLER SYSTEM

(75) Inventors: Wen-Yao Chang, Hsinchu (TW); Tzxy-Chui Wang, Hsinchu (TW); Wu-Hsiung Fu, Hsinchu (TW); Man Tzou, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 81 days.

(21) Appl. No.: 11/987,883

(22) Filed: Dec. 5, 2007

(65) Prior Publication Data

US 2008/0162077 A1 Jul. 3, 2008

(51) Int. Cl.
*G06F 11/30* (2006.01)
(52) U.S. Cl. ...................................... 702/182
(58) Field of Classification Search ................. 702/182; 62/183, 129, 99, 175
See application file for complete search history.

(56) References Cited

U.S. PATENT DOCUMENTS

| | | | | |
|---|---|---|---|---|
| 5,040,377 A | * | 8/1991 | Braun et al. | 62/183 |
| 5,083,438 A | * | 1/1992 | McMullin | 62/129 |
| 5,600,960 A | * | 2/1997 | Schwedler et al. | 62/99 |
| 6,047,555 A | | 4/2000 | Weng | |
| 6,446,448 B1 | * | 9/2002 | Wang et al. | 62/183 |
| 6,532,754 B2 | * | 3/2003 | Haley et al. | 62/129 |
| 6,813,897 B1 | * | 11/2004 | Bash et al. | 62/175 |

* cited by examiner

*Primary Examiner*—Tung S Lau
*Assistant Examiner*—Xiuquin Sun
(74) *Attorney, Agent, or Firm*—Birch, Stewart, Kolasch & Birch, LLP (57) ABSTRACT

A method of evaluating and optimizing performance of a chiller system includes the following steps. Determine a number of activated chillers, a number of activated cooling towers, and the lowest outlet temperature of cooling water of a cooling tower as an operating settings. By developing evaluating models, sequentially determine a temperature of the cooling water entering the chillers, a total power consumption of chillers, a total power consumption of the cooling towers, and a total power consumption of pumping cooling water. Then, determine a total power consumption of the system by the sum of the total power consumption of the chillers, the total power consumption of the cooling towers, and the total power consumption of pumping cooling water. Through the above method, the system total power consumptions under different operating settings are evaluated, so as to determine an optimized operating setting to optimize the performance of the system.

17 Claims, 9 Drawing Sheets

S610 — Retrieve the maximum load factor of each chiller, the outlet temperature of the chilled water of the chiller, the inlet temperature of the chilled water of the chiller, the flow rate of the chilled water, the operating current of the chiller, the temperature of the cooling water entering the chiller as the parameter for developing the model, so as to obtain a plurality of groups of data through experiments

S620 — Calculate to determine the CCOP corresponding to the data, so as to establish a database

S630 — Derive a multiple-order polynomial parameters for developing the evaluating model

S640 — Develop the evaluating model for the CCOP

Verify the evaluating model

METHOD FOR EVALUATING AND OPTIMIZING PERFORMANCE OF CHILLER SYSTEM

CROSS-REFERENCE TO RELATED APPLICATIONS

This non-provisional application claims priority under 35 U.S.C. §119(a) on Patent Application No(s). 095149328 filed in Taiwan, R.O.C. on Dec. 27, 2006, the entire contents of which are hereby incorporated by reference.

BACKGROUND OF THE INVENTION

1. Field of Invention

The present invention relates to chiller systems. More particularly, the present invention relates to a method for optimizing a chiller system by evaluating performance of the chiller system, which is capable of evaluating power consumption of a chiller system through a number of activated chillers, a number of activated cooling towers, and a lowest outlet temperature of cooling water of cooling towers of the system.

2. Related Art

As for places those require air conditioning control, for example, air conditioned buildings, semiconductor factories, and cold storage warehouses, chiller systems are required to provide chilled water to chill the a in those place. Large amounts of electrical power are used by chillers of an air condition control system, and thus, how to improve the efficiency of the chillers becomes an important power-saving issue for being researched.

For the factories or buildings being built, the allocating combination of chillers and cooling towers can be previously designed depending upon the surrounding features of the site, so as to achieve the optimal power-saving performance of the chiller system. However, for those factories or buildings those have being built, since the numbers and locations of the chillers and the cooling towers are fixed, if the power-saving efficiency is intended to be enhanced through a re-designing process, the building must be reconstructed, and the factories or buildings cannot be used temporarily. Therefore, a preferred method is to change the operating setting of the chiller system to ensure that the chiller system can achieve the expected chilling effect with the lowest power consumption.

The changing the operating setting of the chiller system is mainly categorized into two types. One is to monitor temperatures at specific positions in the chiller system, so as to adjust the operating setting of the chiller system by the change of the temperature of these specific positions, so as to achieve the lowest power consumption. However, through this way, the temperatures at the specific positions are retrieved as system feedback parameters, and a single control parameter is used to adjust the specific subsystem, the operating setting of the subsystem must be switched frequently, and the power-saving benefit is still limited. The other one is to evaluate the chiller system at the first place, and then, the optimal operating setting is obtained to operate the chiller system. For example, in U.S. Pat. Nos. 5,040,377, 5,600,960, 6,047,555, and 6,446,448, after the load of the specific subsystem in the chiller system has been evaluated, a corresponding control parameter is obtained to control the load of the subsystem, such that the power consumption of the subsystem is controlled at the optimal state, which does not excessively output. However, only the specific subsystem is evaluated and adjusted, and other subsystems may overload or excessively output, such that the operation of other subsystems causes additionally unnecessary power consumption, and thus, the practical power-saving benefit is reduced.

SUMMARY OF THE INVENTION

In view of the above problems, the present invention provides a method for evaluating and optimizing performance of a chiller system, applicable for fully evaluating the performance of the chiller system, so as to determine an optimized operating setting to optimize the performance of the chiller system.

The present invention provides a method for evaluating and optimizing performance of a chiller system. According to the method, firstly, determine a number of a plurality of chillers and a number of a plurality of cooling towers. According to the numbers of the chillers and the cooling towers, determine a plurality of allocating assemblies having different number of activated chillers and activated cooling towers. Determine the lowest outlet temperature of a cooling water of each cooling tower in each allocating assembly, such that each of the allocating assemblies and the corresponding lowest outlet temperature of the cooling water form a plurality of system allocating combinations. Then, select one of the system allocating combinations, and determine the maximum load factor of each chiller in the system allocating combinations and determine whether the maximum load factor falls in a rated load factor restricted by the specification of each chiller or not. If not, select another system allocating combination. Then, determine a temperature of the cooling water entering each of the chillers in the system allocating assembly. According to the temperature of the cooling water, determine a total power consumption of the activated chillers, a total power consumption of the activated cooling towers, a total power consumption required for pump the cooling water and the chilled water sequentially, and then, determine a total system power consumption of the system allocating combination, so as to evaluate the total power consumption of the system allocating combination. Then, select another system allocating combination, and determine the system total power consumption of the system allocating assembly again, and thus determine the system total power consumptions of all the system allocating combinations. Order different system allocating combinations according to the total system power consumptions thereof, for selecting a system allocating combination with the optimal power consumption, so as to determine the number of the activated chillers, the number of the activated cooling towers, and the lowest outlet temperature of the cooling water of the cooling tower in the system.

According to the present invention, the total system power consumption of the chiller system is evaluated, without changing the current chiller system, and thereby finding out the optimal operating setting. Therefore, the total system power consumption of the chiller system is controlled to improve the power-saving efficiency. Compared with the conventional art of a method for evaluating and controlling a single subsystem, the present invention achieves a more effective power-saving efficiency.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

In order to make a further understanding of the objectives, constructions, features, and functions of the present invention, the detailed description is given below through the embodiments.

The present invention provides a method of evaluating and optimizing the performance of the chiller system, which is used to evaluate the total system power consumption of the chiller system under different settings of the number of the activated cooling towers, the number of the activated chillers, and the lowest outlet temperature of the cooling tower in an ambient temperature, so as to select the settings about the number of the activated cooling towers, the number of the activated chillers, and the lowest outlet temperature of the cooling tower capable of achieving the optimal power-saving efficiency from different total system power consumptions.

The numbers of the cooling towers and the chillers are determined as the chiller system is built, and the numbers of the activated cooling towers and the activated chillers in the chiller system is determined by turning on or off some of the cooling towers and the chillers. Different power efficiencies can be achieved under different allocating combinations having different numbers of activated chillers and activated cooling towers, so that different numbers of activated cooling towers and activated chillers, cooperating with the lowest outlet temperature of the cooling tower are used to change the power efficiency of the chiller system. The method of the present invention is used to evaluate the efficiency under different operating settings, so as to find out the settings with the optimal power saving efficiency.

Figure 1:
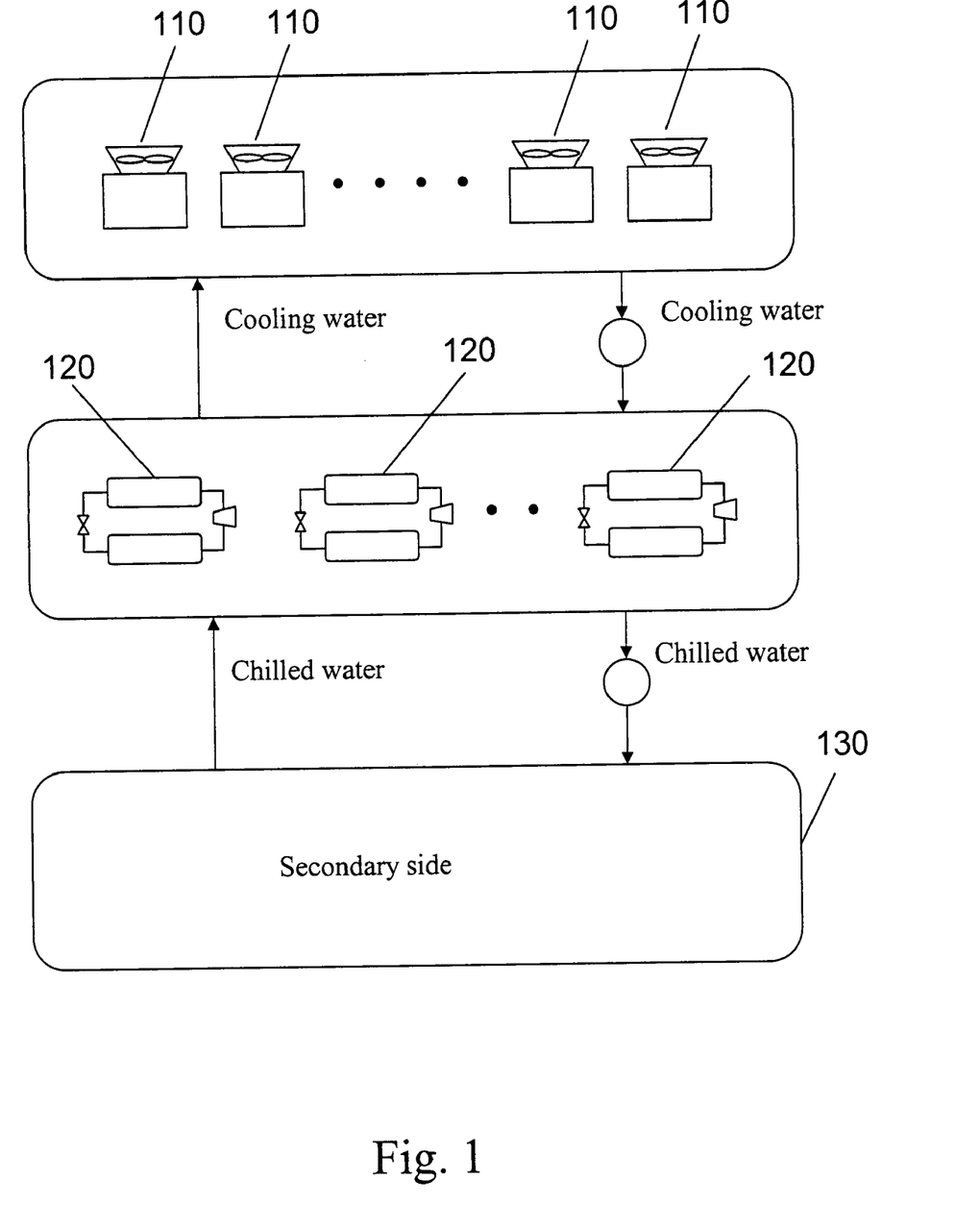
FIG. 1 is a system block diagram of a chiller system.

Referring to FIG. 1, it shows a chiller system, which includes a plurality of cooling towers 110 and a plurality of chillers 120. The chillers 120 are used to provided chilled water to a secondary side 130, for example, an air conditioning system and a cold storage warehouse system, so as to absorb the heat and to lower the temperature of the secondary side 130. The temperature of the chilled water in the secondary side 130 rises after absorbing the heat, and then, the chilled water returns to the chiller 120, which is then again chilled by the chiller 120, and then recycled to the secondary side 130. The cooling tower 110 is used to provide cooling water to the chiller 120 to cool a primary side of the chiller 120, such that the chiller 120 continuously performs the cooling operation to the chilled water. After exiting the chiller 120, the cooling water returns to the cooling tower 110, for exchanging heat with the ambient air, and thereby lowering the temperature of the cooling water.

Figure 2A:
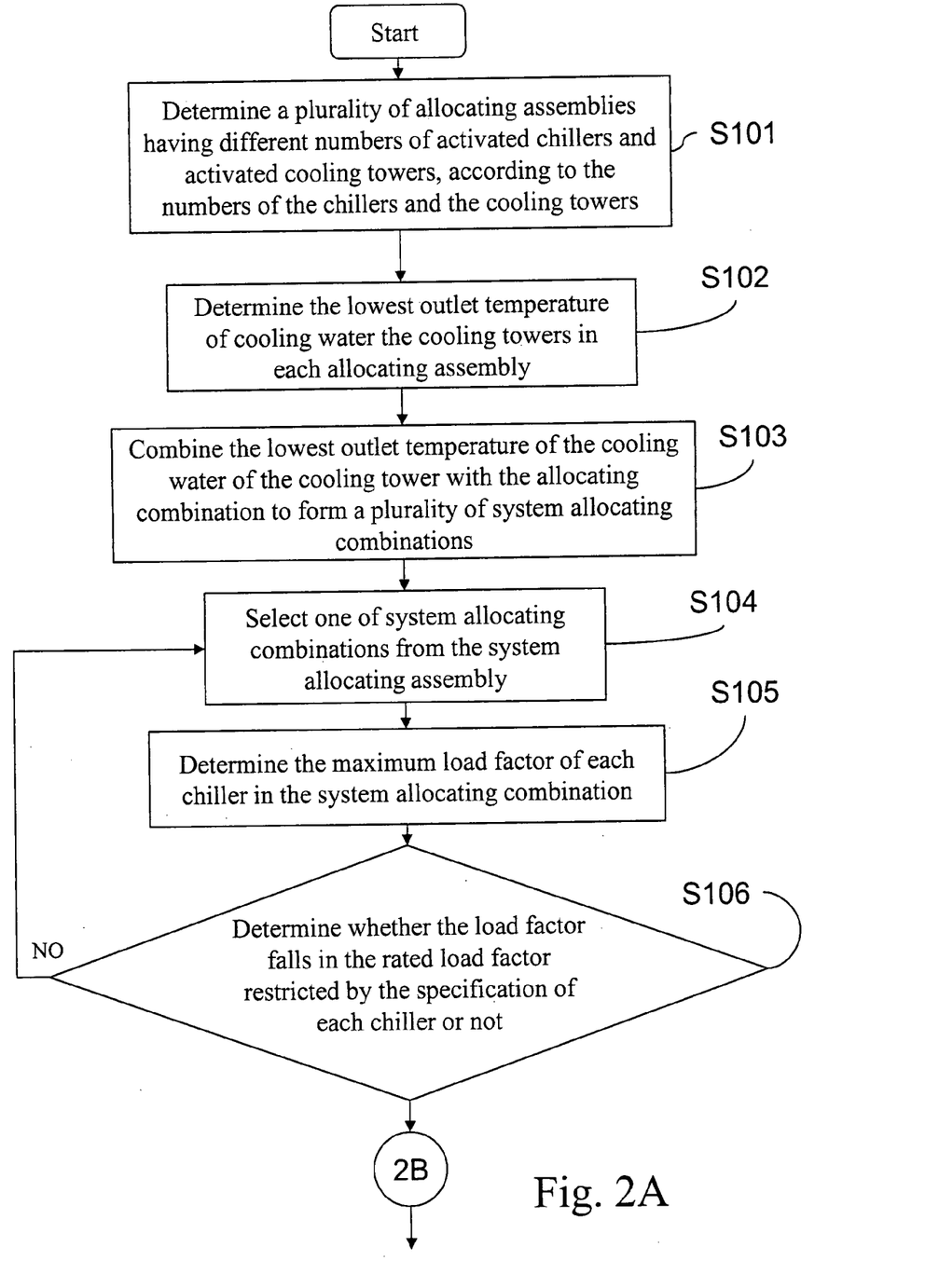
FIGS. 2A and 2B are flow charts of the present invention.
Figure 2B:
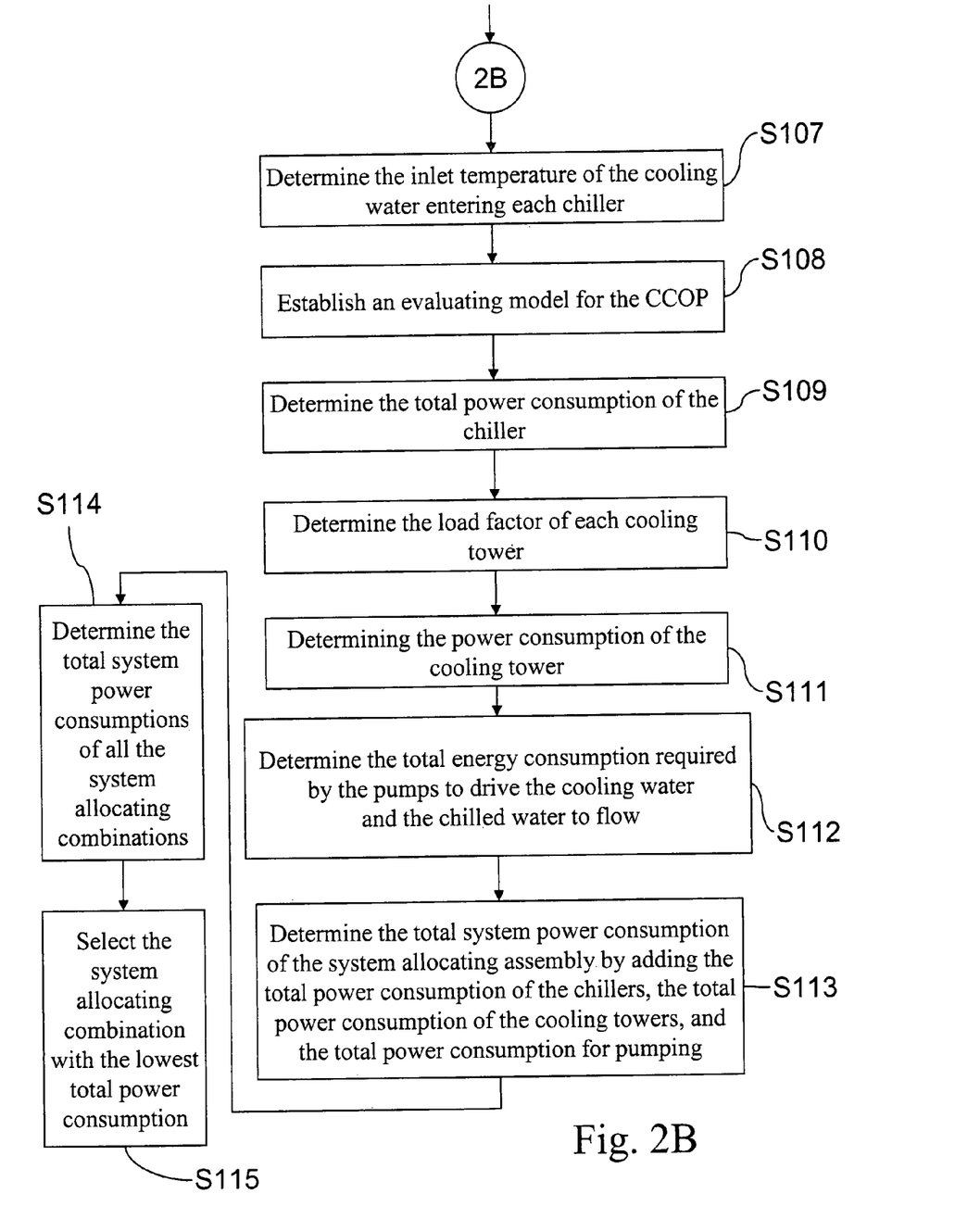

Referring to FIGS. 2A and 2B, the external parameters affecting the total power consumption of the chiller system are mainly the cooling load of the chiller system and the conditions of the ambient environment, including ambient air humidity, a temperature, and an ambient air enthalpy. The above conditions of the external environment may be derived from ambient temperatures including the wet bulb temperature and the dry bulb temperature. For the cooling load of the chiller system (i.e., refrigeration ton), the required specification is set once the system is built. After the conditions of the external environment (i.e., conditions of the ambient air) are determined, it is necessary to set the numbers of the cooling towers and the chiller that are turned on to be activated or turned off to be deactivated. In order to set the numbers of the activated cooling towers and the activated chillers for optimizing the performance of the chiller system, firstly, determine a plurality of allocating assemblies including different numbers of activated chillers and activated cooling towers. If the number of the cooling towers in the chiller system is M, the number of the chillers is N, since at least one cooling tower and at least one chiller have to be activated, the allocating assemblies having different numbers of activated cooling towers and chillers are determined according to the number of the chillers and the cooling towers. The configuration of the allocating assemblies includes (the number of the activated cooling towers, the number of the activated chillers)= (1, 1), (2, 1) . . . to (M, N), all together, there are M*N number of allocating assemblies (S101). In addition, if the number of the activated chillers is the same, actually, the chillers activated may be different, and the difference between the activated chillers is affected by the configurations of the system, such as pipeline allocation, disposition site, which thus causing different power consumption. Therefore, the settings with the same number but different activated chillers and cooling towers are taken as different allocating combinations.

Figure 3:
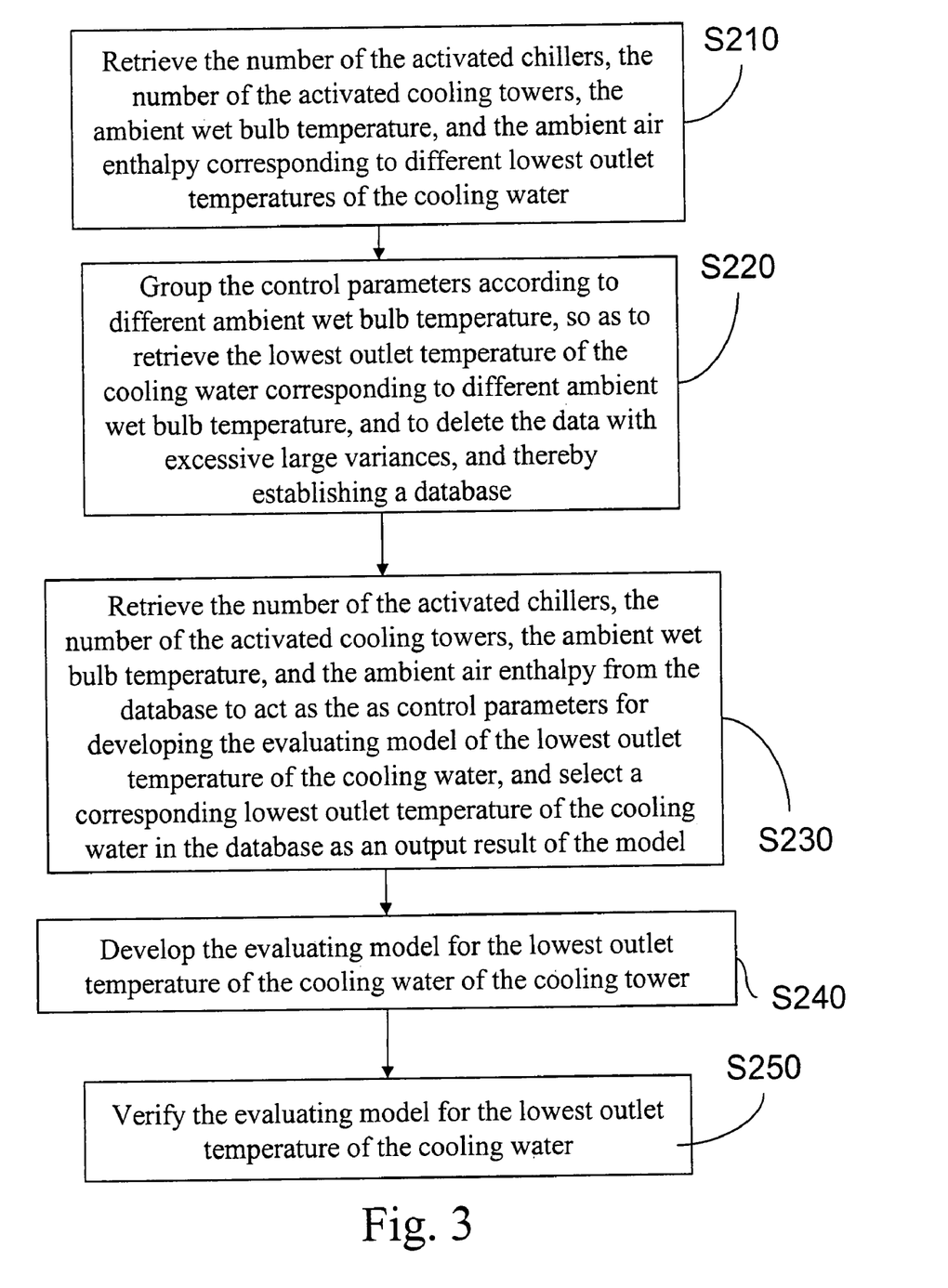
FIG. 3 is a flow chart of developing an evaluating model for the lowest outlet temperature of the cooling water of the cooling towers in the present invention.

Referring to FIGS. 2A, 2B, and 3, next, according to the ambient wet bulb temperature, determine the lowest outlet temperature of the cooling water of each cooling tower in each allocating assembly, such that each allocating assembly and the corresponding lowest outlet temperature of the cooling water form a plurality of system allocating combinations. The outlet temperature of the cooling water is a control parameter required to be preset in the system, which has a lower limit, so that the lowest outlet temperature of the cooling water of the cooling tower must be found out beforehand to act as an operating limiting condition of the cooling tower. The highest outlet temperature of the cooling water may not be higher than the inlet temperature of the cooling water, so the inlet temperature of the cooling water is set as the highest outlet temperature of the cooling water.

Figure 4:
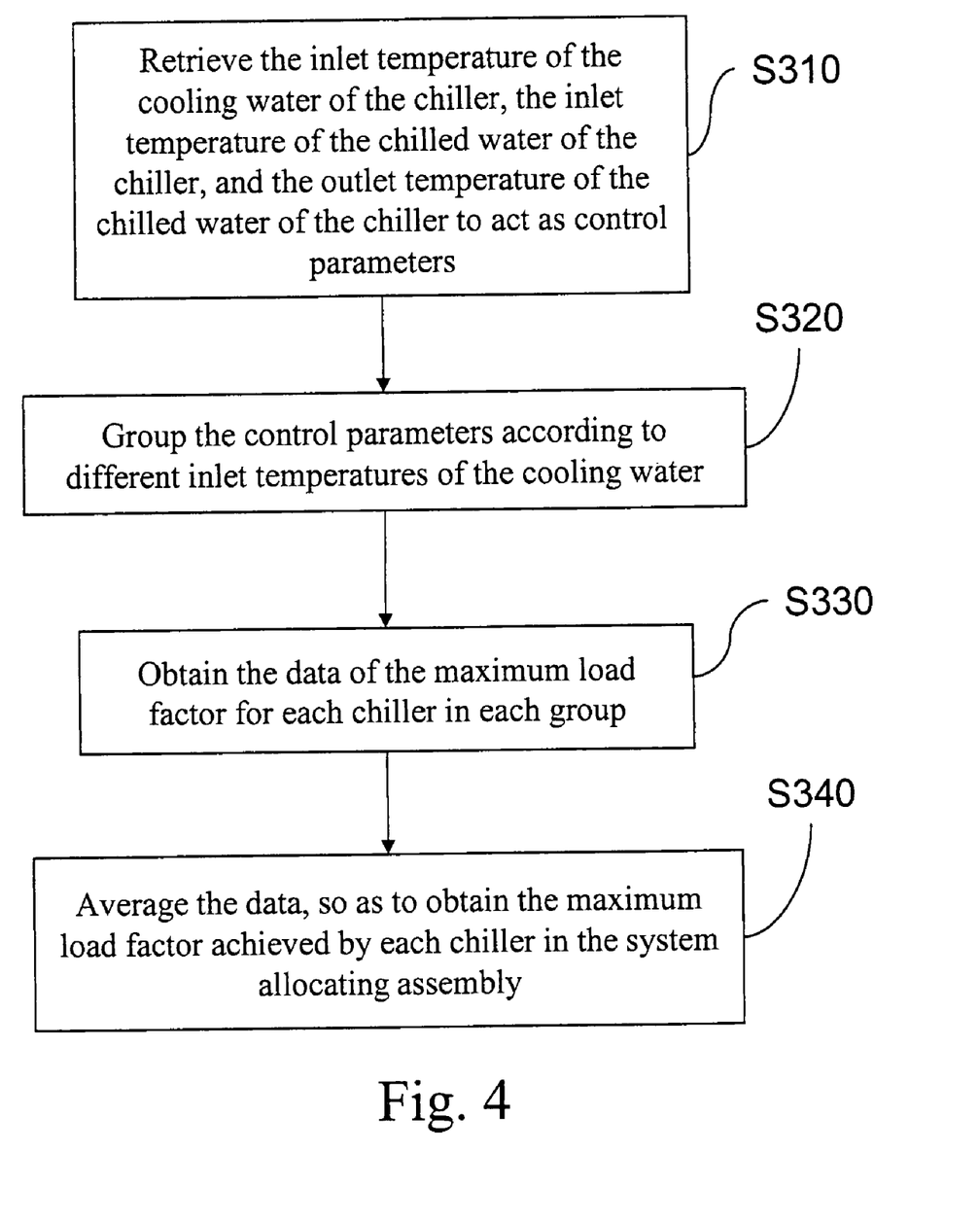
FIG. 4 is a flow chart of obtaining the maximum load factor achieved by each chiller in the present invention.

Referring to FIGS. 2A and 4, they show the process of determining the lowest outlet temperature of the cooling water. The system is operated to perform experiments, so as to retrieve the number of the activated chillers, the number of the activated cooling towers, the ambient wet bulb temperature, and the ambient air enthalpy corresponding to different lowest outlet temperatures of the cooling water (S210). Group the control parameters according to different ambient wet bulb temperature, so as to retrieve the lowest outlet temperature of the cooling water corresponding to different ambient wet bulb temperature, and to delete the data with excessive large variances, and thereby establishing a database (S220). Retrieve the number of the activated chillers, the number of the activated cooling towers, the ambient wet bulb temperature, and the ambient air enthalpy from the database to act as the as control parameters for developing the evaluating model of the lowest outlet temperature of the cooling water, and select a corresponding lowest outlet temperature of the cooling water in the database as an output result of the model (S230). Then develop the evaluating model for the lowest outlet temperature of the cooling water of the cooling tower through PLS, neuro network, or fuzzy logic, by adopting the number of the activated chillers, the number of the activated cooling towers, the ambient wet bulb temperature, and the ambient air enthalpy as control parameters (S240). Once the evaluating model has been finished, the evaluating model for the lowest outlet temperature of the cooling water is verified and modified according to the known data and results in the database (S250). The evaluating model is used to evaluate the lowest outlet temperature of the cooling water of the cooling tower under the allocating combination.

Determine the corresponding lowest outlet temperature of the cooling water of the cooling tower according to the evaluating model under the current ambient wet bulb temperature interval (S102), and through combining the lowest outlet temperature of the cooling water of the cooling tower with the allocating combination to form a plurality of system allocating combinations (S103). That is, a number of the activated chillers, a number of the activated cooling towers, and a corresponding lowest outlet temperature of the cooling water of the cooling tower forms a system allocating combination for operating the chiller system. The power consumption of such a system allocating combination is required to be evaluated, so as to determine whether the system allocating combination is the optimal operating setting or not. Definitely, the lowest outlet temperature of the cooling water of the cooling tower corresponding to the allocating combinations with different numbers of the activated chillers and cooling towers is firstly found out, so as to form a system allocating assembly composed by a plurality of system allocating combinations, and then, the system allocating combinations are evaluated one by one.

The chillers achieve different maximum load factors during the operation under different inlet temperatures of the cooling water. Each chiller has a rated load factor limited by the specification, so that the maximum load factor must be ensured to fall within the rated load factor restricted by the specification, so as to assure the normal operation. Otherwise, the system allocating combination must be set as out of service, and to select another system allocating combination to perform the evaluation.

Referring to FIGS. 2A and 4, to evaluate the maximum load factor of the chiller in the step, as for a system allocating combination, firstly, select one of system allocating combinations from the system allocating assembly (S104), and then determine the maximum load factor of each chiller in the system allocating combination (S105). Determine whether the load factor falls in the rated load factor restricted by the specification of each chiller or not (S106). If not, select another system allocating combination.

Referring to FIG. 4, to evaluate the maximum load factor, firstly, retrieve the inlet temperature of the cooling water of the chiller, the inlet temperature of the chilled water of the chiller, and the outlet temperature of the chilled water of the chiller to act as control parameters (S310), and then, retrieve the corresponding load factor of each chiller through numerical methods or experiments. Then, group the control parameters according to different inlet temperatures of the cooling water (S320), and obtain the data of the maximum load factor for each chiller in each group (S330). And then, average the data, so as to obtain the maximum load factor achieved by each chiller in the system allocating assembly (S340). The evaluation of the maximum load factor is not directly used to evaluate the performance of the system, but acts as an important criterion for determining whether the system operates normally and does not overload.

Referring to FIG. 2B, the inlet temperature of the cooling water actually entering the chiller has to be determined in the system allocating combination (S107), for evaluating the practical load and the power consumption of the chiller.

Figure 5:
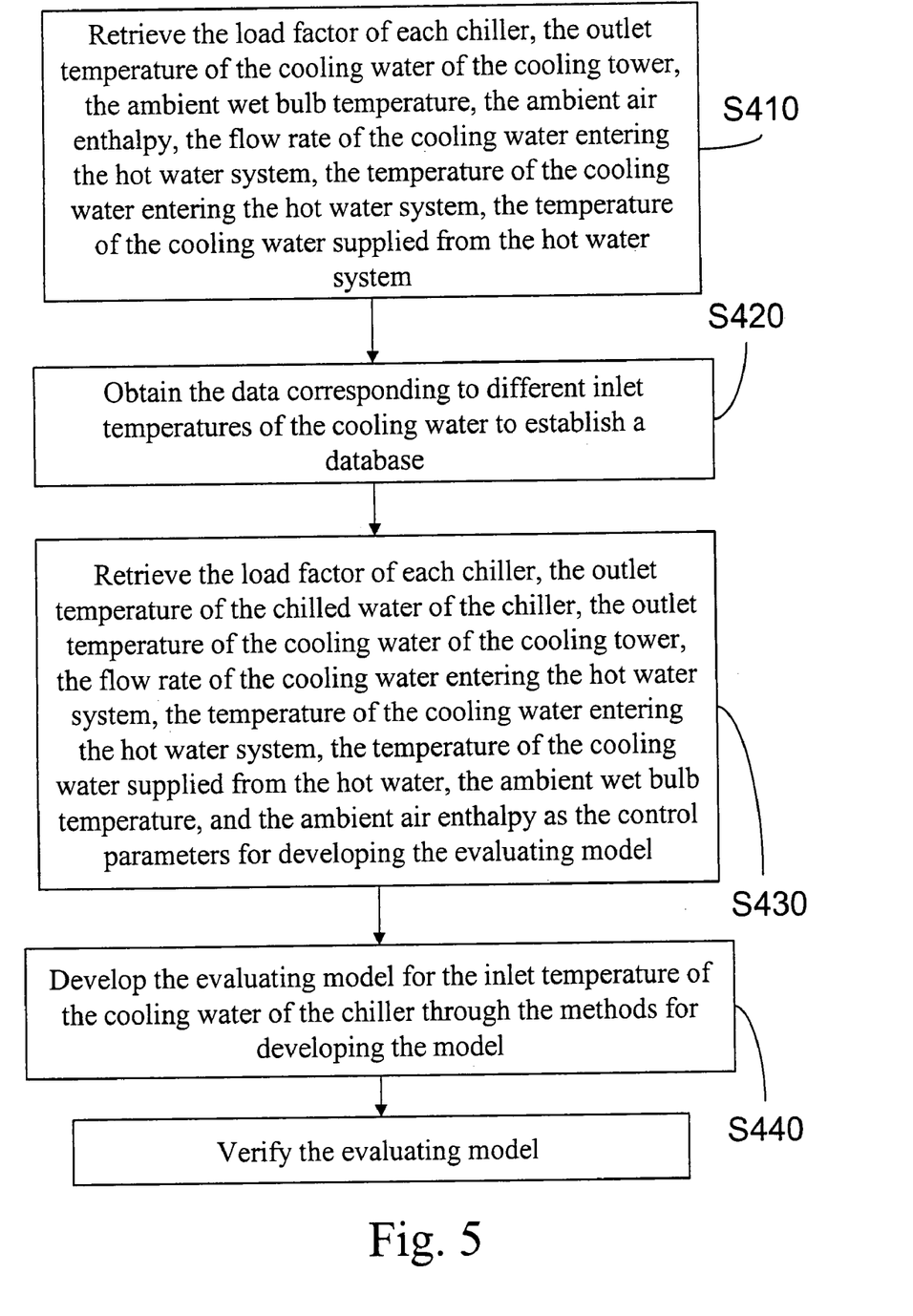
FIG. 5 is a flow chart of developing an evaluating model for the inlet temperature of the cooling water of the chiller in the present invention.

Referring to FIG. 5 and FIG. 2B, the evaluating model of the inlet temperature of the cooling water of the chiller is developed by collecting collect the required operating parameters according to the operating features of the chiller, including the load factor of each chiller (in direct proportion to the inlet and outlet temperatures of the chilled water of the chiller), the outlet temperature of the cooling water of the cooling tower, the ambient wet bulb temperature, and the ambient air enthalpy. In addition, in summer, due to the high temperature difference between the indoor temperature and the outside temperature, the outlet temperature of the cooling water of the chiller is excessively high. In order to avoid the circumstance that the cooling tower cannot effectively reduce the temperature, a part of the cooling water from the chiller is firstly mixed with the cold water in the hot water system of the building, and after heat loss occurs and the temperature is reduced, the cooling water enters the cooling tower again. Therefore, the flow rate of the cooling water entering the hot water system, the temperature of the cooling water entering the hot water system, and the temperature of the cooling water compensated by the hot water have be considered as well. Retrieve the above control parameters, operate the system for experiments (S410), so as to obtain the data corresponding to different inlet temperatures of the cooling water, and thus establishing a database (S420). Then, retrieve the load factor of each chiller, the outlet temperature of the chilled water of the chiller, the outlet temperature of the cooling water of the cooling tower, the flow rate of the cooling water entering the hot water system, the temperature of the cooling water entering the hot water system, the temperature of the cooling water supplied from the hot water, the ambient wet bulb temperature, and the ambient air enthalpy as the control parameters for developing the evaluating model, and select a corresponding inlet temperature of the cooling water as an output result of the model (S430). Develop the evaluating model for the inlet temperature of the cooling water of the chiller through the methods for developing the model, such as PLS, neuro network, or the fuzzy logic, by adopting above control parameters (S440), and then verify the model, and thereby determining the inlet temperature of the cooling water of the chiller. The flow rate of the water entering the hot water system, the outlet temperature of the hot water system, the ambient wet bulb temperature, and the ambient air enthalpy are the environment conditions, which are set depending upon the requirements of the site of the chiller system operated. The outlet temperature of the cooling water of the cooling water is set as the operating limit that can be achieved by the cooling tower, i.e., the lowest outlet temperature of the cooling water of the cooling tower, and in this way, the model is used to determine the temperature of the cooling water entering each chiller.

After developing the evaluating model, and determining each control parameter according to the system allocating combination, determine the system total power consumption. The process of determining the system total power consumption includes three parts: determining the power consumption of the chiller, determining the power consumption of the cooling tower, and determining the total system power consumption of pumping the cooling water and the chilled water.

Referring to FIG. 2B, the power consumption of the chiller is the electric power $KW_i$ required by the compressor to remove the heat load $CL_i$, and the relationship of the heat load $CL_i$ and the electric power $KW_i$ of the compressor may represented as a chiller's coefficient of performance (CCOP). The CCOP is a dimensionless parameter and a ratio of the electric energy $KW_I$ of the compressor of the chiller to the heat load $CL_i$ of the chiller. Therefore, through establishing an evaluating model for the CCOP (S108), the CCOP can be used to determine the total power consumption of the chiller (S109), in which $$CCOP=KW_i/CL_i,$$

and the heat load $CL_i$ of each chiller is:

$$CL_i=(Tchr_i-Tchs_i) \times Fchw \times Cp \times 1000,$$

in which $Tchr_i$ is an inlet temperature of the chilled water of the chiller; $Tchs_i$ is an outlet temperature of the chiller; Fchw is a flow rate of the chilled water pumped by the chilled water pump, which is specified by the specification of the device, note that the unit of the Fchw is cubic meter per hour; Cp is a constant-pressure specific heat of the water; 1000 is a conversion constant for the unit conversion; and furthermore, the subscript i is a marking number of the chiller.

The electric power $KW_i$ of the compressor of the chiller is:

$$KW_i=V \times I \times 3^{1/2} \times P.F \times 3600/1000,$$

In which V is an operating voltage of the compressor of the chiller, which is specified by the specification of the device; I is an operating current of the compressor of the chiller, which varies according to the operating state; P.F is a power factor, i.e., the relationship between the practical power consumption and the theoretical power consumption, which is specified by the establishing configuration of the system; and 3600/1000 is a conversion constant for the unit conversion.

Figure 6:
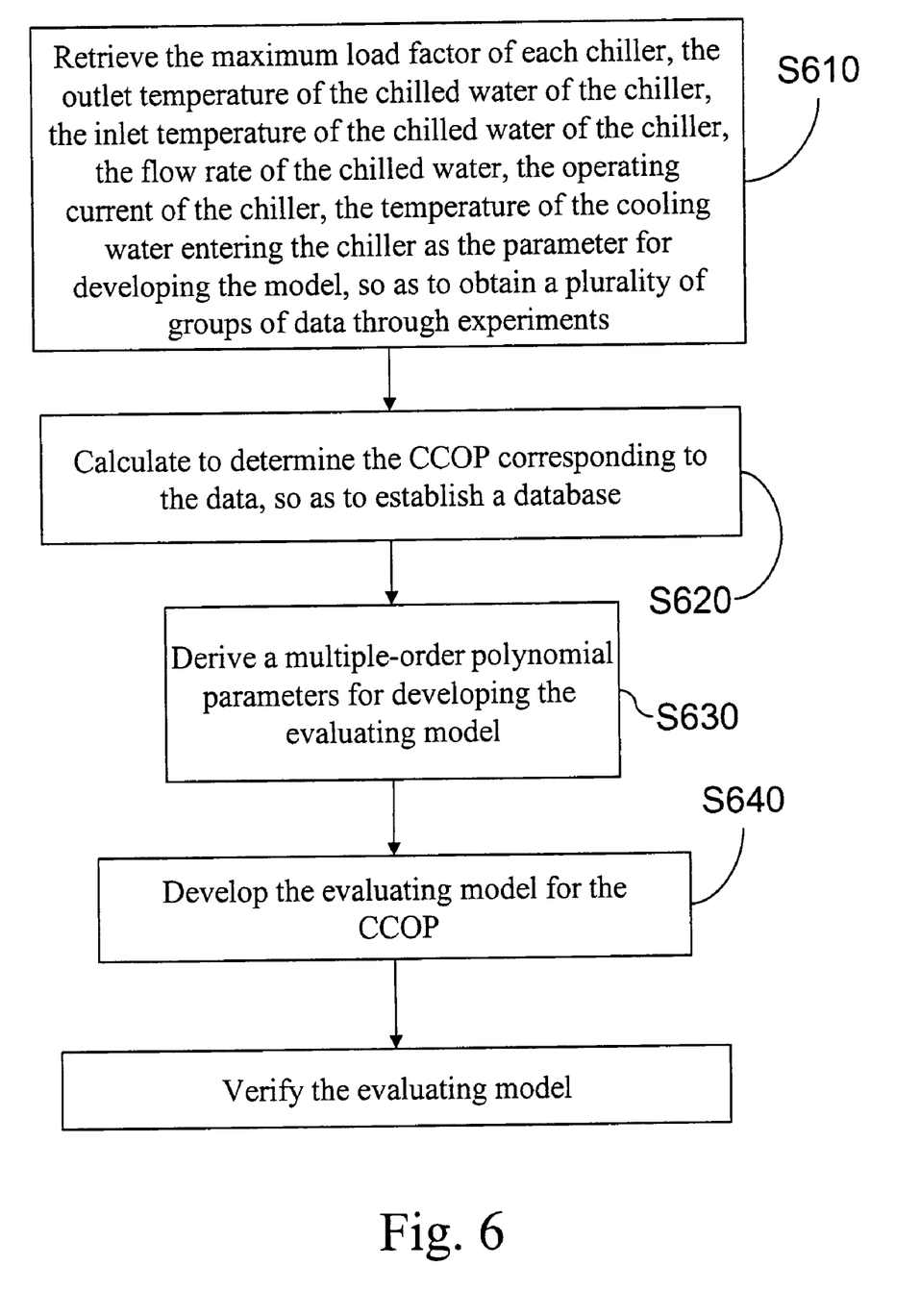
FIG. 6 is a flow chart of developing an evaluating model for the chiller's coefficient of performance of the chiller in the present invention.

Referring to FIG. 6, for developing an evaluating model for the CCOP of the chiller, the load factor of each chiller, firstly, retrieve the outlet temperature of the chilled water of the chiller, the inlet temperature of the chilled water of the chiller, the flow of the chilled water, the operating current of the chiller, the temperature of the cooling water entering the chiller to act as the parameters for developing the model, so as to obtain a plurality of groups of data through experiments. Then, determine the load factor of each chiller according to the outlet temperature of the chilled water of the chiller, the inlet temperature of the chilled water of the chiller, and the flow of the chilled water (S610). Calculate to determine the CCOP corresponding to the data, so as to establish a database (S620). Derive a multiple-order polynomial parameters by adopting the load factor of each chiller, and the temperature of the cooling water entering the chiller as variables, that is to say, besides the above parameters for developing the model, the parameters for developing the model further includes the square of the load factor of each chiller, the square of the temperature of the cooling water entering the chiller, and the product of multiplying the load factor of each chiller by the temperature of the cooling water entering the chiller (S630). And then, develop the evaluating model for CCOP through the methods of developing the model such as PLS, neuro network, or fuzzy logic (S640), and finally verify the evaluating model. The CCOP of each chiller can be obtained according to the previously evaluated maximum load factor of the chiller and the temperature of the cooling water entering the chiller. The product of multiplying the CCOP by the maximum load factor of the chiller is the power consumption of the compressor of the chiller, which is further multiplied by the number of the activated chillers, so as to determine the total power consumption of the activated chillers.

Referring to FIG. 2B, before determining the power consumption of the cooling tower (S111), it is required to determine the load factor of each cooling tower at first (S110). The load factor of the cooling tower varies depend on parameters, such as the total power consumption of the chiller, the load factor of the chiller, and the load factor of the hot water system. Therefore, it is necessary to analysis the effects of the above factors on the load factor of the cooling tower to develop an evaluating model, and thus, the load factor of the cooling tower can be evaluated according to the known or evaluated inlet temperature of the cooling water of the cooling tower, the total flow rate of the cooling water exiting from the chiller system, the flow rate of the cooling water supplied from the hot water system, and the flow rate of the cooling water entering the hot water.

Figure 7:
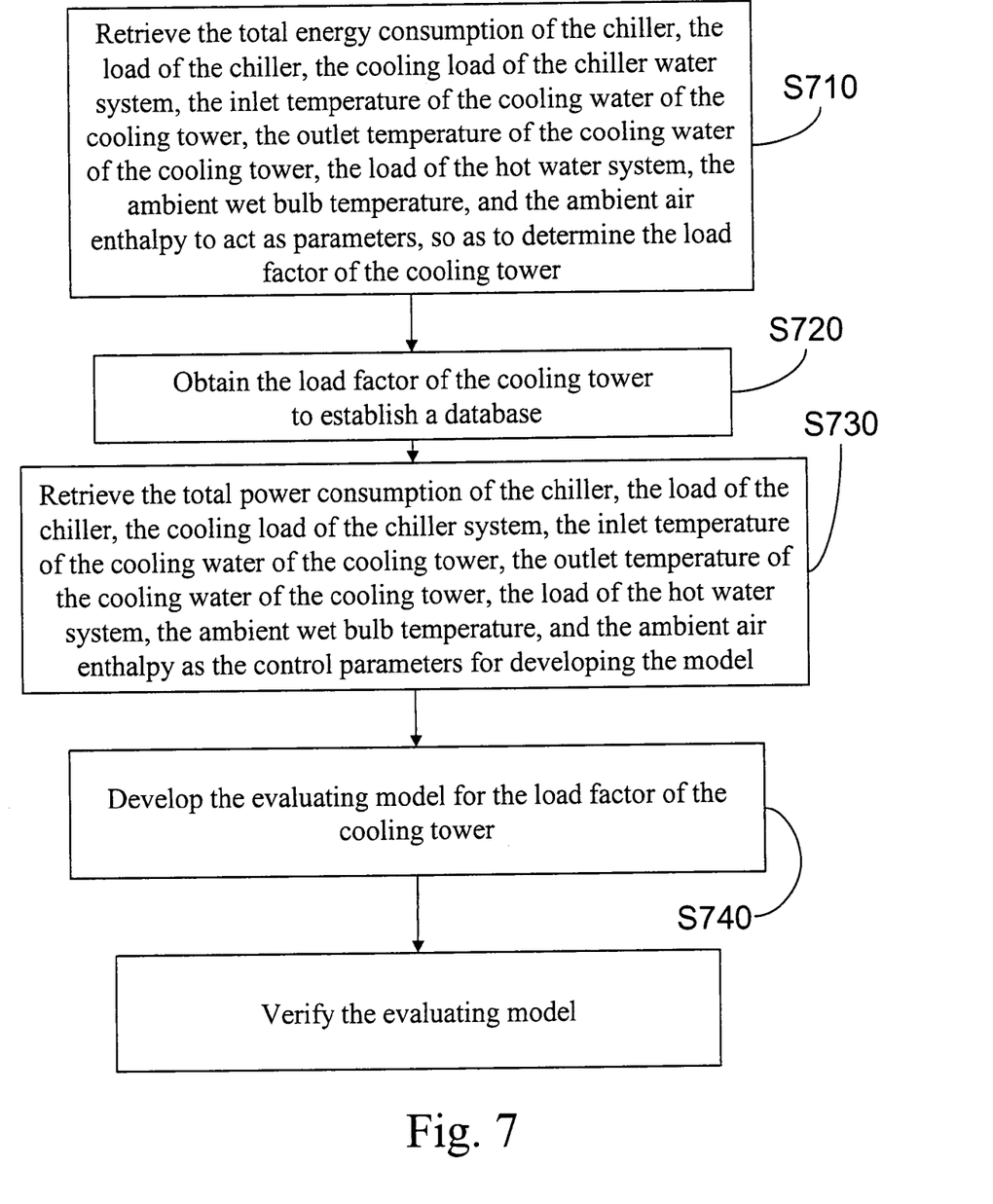
FIG. 7 is a flow chart of developing an evaluating model for the load factor of the cooling tower in the present invention.

Referring to FIG. 7, as for the process of developing the model, firstly, retrieve the parameters such as the total power consumption of the chiller, the load of the chiller, the cooling load of the chiller system, the inlet temperature of the cooling water of the cooling tower, the outlet temperature of the cooling water of the cooling tower, the load of the hot water system, the ambient wet bulb temperature, and the ambient air enthalpy, so as to determine the load factor of the cooling tower through numerical method or experiments (S710), and thus obtaining the data of the load factor of the cooling tower, so as to establish a database (S720). Retrieve the total power consumption of the chiller, the load of the chiller, the cooling load of the chiller system, the inlet temperature of the cooling water of the cooling tower, the outlet temperature of the cooling water of the cooling tower, the load of the hot water system, the ambient wet bulb temperature, and the ambient air enthalpy to act as control parameters for developing the evaluating model, and select a corresponding load factor of the cooling tower as an output result of the model (S730). According to above parameters and the output results, develop the evaluating model for the load factor of the cooling tower through the method of developing the model, such as PLS, neuro network, or fuzzy logic, by means of retrieving data from the database, and taking the parameters such as the inlet temperature of the cooling water of the cooling tower, the total flow of the cooling water exiting from the chiller system, the flow rate of the cooling water supplied from the hot water system, and the flow rate of the cooling water entering the hot water system as control parameters (S740), and then verify the model, and thus, the load factor of each cooling tower can be evaluated.

After the load factor of the cooling tower is obtained, the power consumption is derived from the load factor of the cooling tower, so as to determine the total power consumption of the activated cooling tower in the system allocating assembly.

Figure 8:
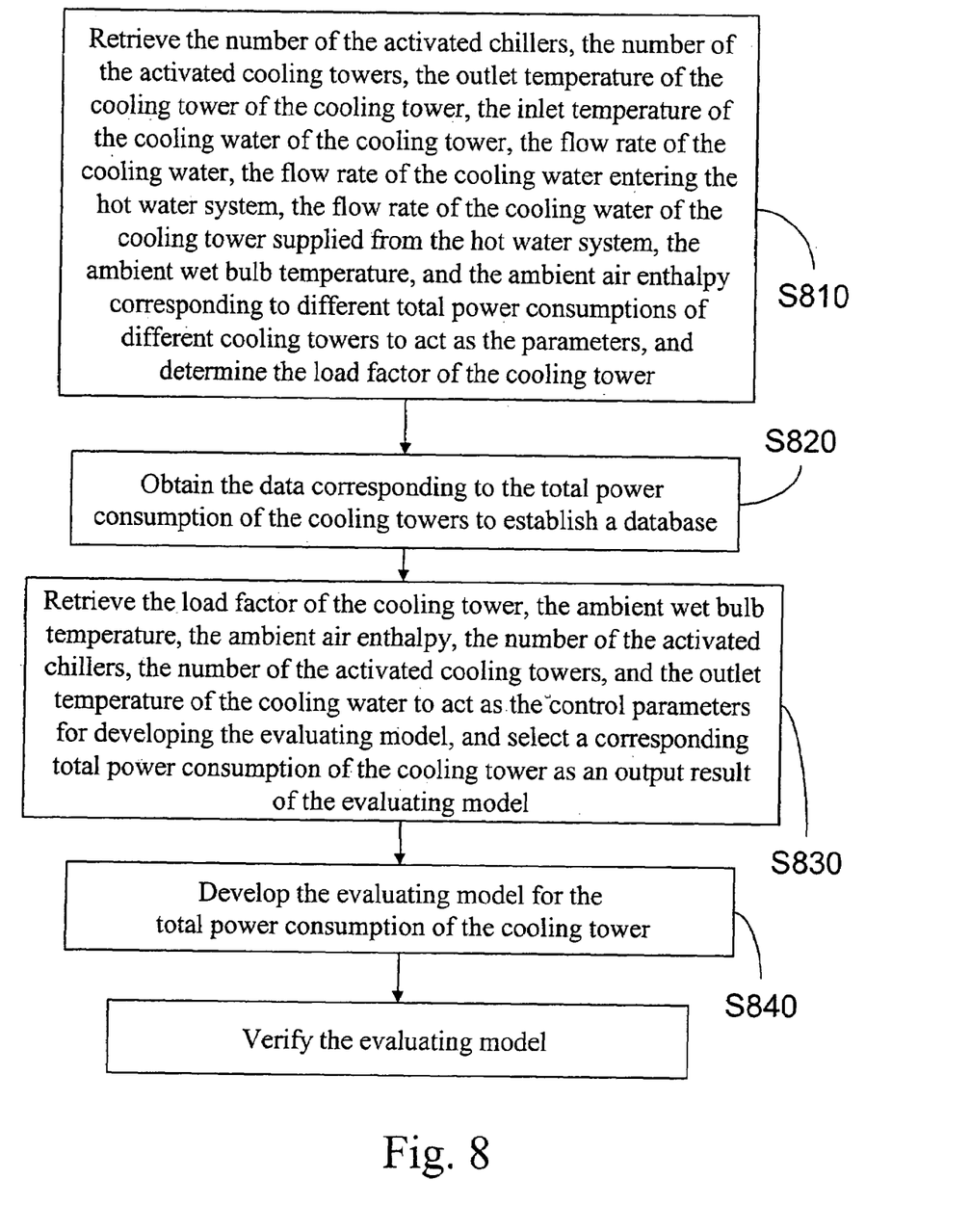
FIG. 8 is a flow chart of developing an evaluating model for the total power consumption of the cooling tower in the present invention.

Referring to FIG. 8, retrieve the number of the activated chillers, the number of the activated cooling towers, the outlet temperature of the cooling water of the cooling tower, the inlet temperature of the cooling water of the cooling tower, the flow rate of the cooling water, the flow rate of the cooling water entering the hot water system, the flow rate of the cooling water of the cooling tower supplied from the hot water system, the ambient wet bulb temperature, and the ambient air enthalpy corresponding to different total power consumptions of different cooling towers, and then determine the load factor of the cooling tower (S810), so as to obtain the data corresponding to the total power consumptions of the cooling towers to establish a database (S820). Since the total power consumption of the cooling towers is mainly affected by the following surrounding conditions: the load factor of the cooling tower, the ambient wet bulb temperature, the total flow rate of the cooling water of the chiller system; and the control parameters for the total power consumption of the cooling towers include the number of the activated chillers, the number of the activated cooling towers, and the outlet temperature of the cooling water. Retrieve The load factor of the cooling tower, the ambient wet bulb temperature, the ambient air enthalpy, the number of the activated chillers, the number of the activated cooling towers, and the outlet temperature of the cooling water to act as control parameters for developing the evaluating model, and select a corresponding total power consumption of the cooling tower as an output result of the model (S830), and then develop the evaluating model for the total power consumption of the cooling tower through the method of developing the model, such as PLS, neuro network, or fuzzy logic (S840), and finally verify the model, and thus determining the total power consumption of the activated cooling towers in the system allocating assembly.

The last part in the power consumption of the chiller system is the total power consumption required for pumping the cooling water and the chilled water (S112). Since water is an uncompressible fluid, the power consumption required for pumping the water is mainly relevant to the flow rate of the water and the flow resistance of water in the pipes. In the chiller system, the flow rate of the water is the sum of the flow rate of the cooling water and the chilled water, and the flow resistance of the water in the pipes is relevant to the number of the activated chillers and the number of the activated cooling towers. Therefore, by means of numerical method, empirical formula, or experiments, the total power consumption for pumping corresponding to parameters can be found out, so as to establish the database. Furthermore, the total flow rate of the cooling water and the chilled water is relevant to the number of the activated chillers and the number of the activated cooling towers. Therefore, through the for developing model, develop an evaluating model for the total power consumption for pumping by means of retrieving data from the database through the method of developing the model, such as PLS, neuro network, or fuzzy logic, and take the number of the activated chillers and the number of the activated cooling towers as control parameters, and thus, determine the total power consumption for pumping in the system allocating assembly.

Referring to FIG. 2B, determine the total system power consumption of the system allocating assembly by adding the total power consumption of the chillers, the total power consumption of the cooling towers, and the total power consumption for pumping (S113). Then, select another system allocating combination, and determine its system total power consumption, and thus, the total system power consumptions of all the system allocating combinations can be determined (S114). In this manner, a database is established, and the total power consumption of different systems can be found out. Then, the surrounding conditions are used for grouping, for example, the ambient wet bulb temperature and the cooling load of the chiller system, and then, order the different system allocating combinations according to the total power consumption, and select the system allocating combination with the lowest total power consumption (S115), to act as the strategy for setting the number of the activated chillers, the number of the activated cooling towers, and the outlet temperature of the cooling tower, such that the operating power consumption of the chiller system can achieve the optimal state.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of evaluating performance of a chiller system, comprising the following steps:
   (1) determining a number of a plurality of chillers and a number of a plurality of cooling towers, and then determining a plurality of allocating assemblies having different numbers of activated chillers and activated cooling towers, according to the numbers of the chillers and the cooling towers;
   (2) determining the lowest outlet temperature of cooling water of the cooling towers in each allocating assembly, such that each of the allocating assemblies and the corresponding lowest outlet temperature of the cooling water form a plurality of system allocating combinations;
   (3) selecting one of the system allocating combinations, and determining an inlet temperature of the cooling water of each chiller;
   (4) determining a total power consumption of the activated chillers in the system allocating combination;
   (5) determining a total power consumption of the activated cooling towers in the system allocating combination;
   (6) determining a total power consumption for pumping cooling water and chilled water in the system allocating combination, and then determining a total system power consumption of the system allocating combination by adding the total power consumption of the chillers, the total power consumption of the cooling towers, and the total power consumption of the pumping; and
   (7) selecting another system allocating combination, and determining a total system power consumption of the system allocating combination, so as to determine the total system power consumptions of all the system allocating combinations.

2. The method of evaluating the performance of the chiller system as claimed in claim 1, further comprising a step of ordering different system allocating combinations according to the total power consumption.

3. The method of evaluating the performance of the chiller system as claimed in claim 1, wherein the step of determining the lowest outlet temperature of the cooling water of the cooling towers in each allocating assembly comprises developing an evaluating model of the lowest outlet temperature of the cooling water by adopting the number of the activated chillers, the number of the activated cooling towers, an ambient wet bulb temperature, an ambient air enthalpy as control parameters, so as to determine the lowest outlet temperature of the cooling water of each cooling tower.

4. The method of evaluating the performance of the chiller system as claimed in claim 3, wherein the step of developing the evaluating model for the lowest outlet temperature of the cooling water comprises:
   retrieving the number of the activated chillers, the number of the activated cooling towers, the ambient wet bulb temperature, the ambient air enthalpy corresponding to different lowest outlet temperatures of the cooling water, to establish a database;

retrieving the number of the activated chillers, the number of the activated cooling towers, the ambient wet bulb temperature, and the ambient air enthalpy from the database to act as control parameter for developing the model, and selecting a corresponding lowest outlet temperature of the cooling water as a result of the model; and developing the evaluating model for the lowest outlet temperature of the cooling water.

5. The method of evaluating the performance of the chiller system as claimed in claim 1, further comprising a step of determining the maximum load factor of each chiller in the system allocating combination to determine whether the maximum load factor falls in a rated load factor restricted by the specification of each chiller or not, and if not, selecting another system allocating combination.

6. The method of evaluating the performance of the chiller system as claimed in claim 5, wherein the step of determining the maximum load factor of each chiller in the system allocating combination comprises:

retrieving an inlet temperature of the cooling water of the chiller, an inlet temperature of the chilled water of the chiller, and an outlet temperature of the chilled water of the chiller as control parameters, and then retrieving a corresponding load factor for each chiller;

grouping the control parameters according to different inlet temperatures of the cooling water, and obtaining the maximum load factor of each chiller in each group; and averaging the maximum load factor of each chiller in each group to obtain the maximum load factor achieved by each chiller in the system allocating combination.

7. The method of evaluating the performance of the chiller system as claimed in claim 1, wherein the step of determining the inlet temperature of the cooling water of each chiller comprises developing an evaluating model for the inlet temperature of cooling water of the chiller by adopting the load factor of the chiller, the outlet temperature of cooling water of the cooling tower, the ambient wet bulb temperature, and the ambient air enthalpy as control parameters.

8. The method of evaluating the performance of the chiller system as claimed in claim 7, wherein the step of developing the evaluating model for the inlet temperature of the cooling water comprises:

retrieving the inlet temperature of the chilled water of the chiller, the outlet temperature of the chilled water of the chiller, the outlet temperature of the cooling water of the cooling tower, the ambient wet bulb temperature, and the ambient air enthalpy corresponding to different inlet temperatures of the cooling water of the chiller, and determining the load factor for each chiller according to the inlet temperature of the chilled water of the chiller and the outlet temperature of the chilled water of the chiller, so as to establish a database;

retrieving the load factor of the chiller, the outlet temperature of the cooling water of the cooling water, the ambient wet bulb temperature, and the ambient air enthalpy from the database as control parameters for developing the evaluating model, and selecting a corresponding inlet temperature of the cooling water as an output result of the evaluating model; and developing the evaluating model for the inlet temperature of the cooling water.

9. The method of evaluating the performance of the chiller system as claimed in claim 1, wherein the step of determining the inlet temperature of the cooling water of each chiller comprises developing an evaluating model for the inlet temperature of the cooling water of the chiller by adopting the load factor of each chiller, the outlet temperature of the cooling water of the cooling tower, a flow rate of cooling water entering a hot water system, a temperature of the cooling entering the hot water system, a temperature of the cooling water supplied from the hot water, the ambient wet bulb temperature, and the ambient air enthalpy as control parameters.

10. The method of evaluating the performance of the chiller system as claimed in claim 9, wherein the step of developing the evaluating model for the inlet temperature of the cooling water comprises:

retrieving the inlet temperature of the chilled water of the chiller, the outlet temperature of the chilled water of the chiller, the outlet temperature of the cooling water of the cooling tower, the flow rate of the cooling water entering the hot water system, the temperature of the cooling water entering the hot water system, the temperature of the cooling water supplied from the hot water, the ambient wet bulb temperature, and the ambient air enthalpy corresponding to different inlet temperatures of the cooling water of the chiller;

determining the load factor of each chiller according to the inlet temperature of the chilled water of the chiller and the outlet temperature of the chilled water of the chiller;

determining a load of the hot water system according to the flow rate of the cooling water entering the hot water system, the temperature of the cooling water entering the hot water system, and the temperature of the cooling water supplied from the hot water, so as to establish a database;

retrieving the load factor of the chiller, the outlet temperature of the cooling water of the cooling tower, the load of the hot water system, the temperature of the cooling water entering the hot water system, the temperature of the cooling water supplied from the hot water system, the ambient wet bulb temperature, and the ambient air enthalpy from the database to act as control parameters for developing the evaluating model, and selecting a corresponding inlet temperature of the cooling water; and developing the evaluating model for the inlet temperature of the cooling water.

11. The method of evaluating the performance of the chiller system as claimed in claim 1, wherein the step of determining the total power consumption of the activated chillers comprises:

determining a chiller's coefficient of performance of the chillers; and obtaining a product of multiplying the maximum load of the chillers by the chiller's coefficient of performance as the total power consumption of the activated chillers;

wherein the chiller's coefficient of performance is a ratio of an electric energy used by a compressor of the chiller to a heat load of the chiller.

12. The method of evaluating the performance of the chiller system as claimed in claim 10, wherein the step of determining the chiller's coefficient of performance of the chiller comprises developing an evaluating model for the chiller's coefficient of performance by taking the maximum load factor of the chiller and the temperature of the cooling water entering the chiller as control variables.

13. The method of evaluating the performance of the chiller system as claimed in claim 12, wherein the step of developing the evaluating model for the chiller's coefficient of performance comprises:
   retrieving the outlet temperature of the chilled water of the chiller, the inlet temperature of the chilled water of the chiller, the flow of the chilled water, an operating current of the chiller, and the temperature of the cooling water entering the chiller; calculating the chiller's coefficient of performance of the chiller;
   determining the load factor of each chiller according to the outlet temperature of the chilled water of the chiller, the inlet temperature of the chilled water of the chiller, and the flow of the chilled water, so as to establish a database;
   retrieving the load factor of each chiller, the temperature of the cooling water entering the chiller, a square of the load factor of each chiller, a square of the temperature of the cooling water entering the chiller, and a product of multiplying the load factor of each chiller by the temperature of the cooling water entering the chiller from the database to act as control variables for developing the model, and selecting a corresponding chiller's coefficient of performance of the chiller as an output result of the model; and
   developing the evaluating model for the chiller's coefficient of performance.

14. The method of evaluating the performance of the chiller system as claimed in claim 1, further comprising a step of developing an evaluating model for the total power consumption of the cooling tower by taking the load factor of the cooling tower, the ambient wet bulb temperature, the ambient air enthalpy, the number of the activated chillers, the number of the activated cooling towers, and the outlet temperature of the cooling water as control parameters, so as to determine the total power consumption of the cooling tower.

15. The method of evaluating the performance of the chiller system as claimed in claim 14, wherein the step of developing the evaluating model for the total power consumption of the cooling tower comprises:
   retrieving the number of the activated chillers, the number of the activated cooling towers, the outlet temperature of the cooling water of the cooling tower, the inlet temperature of the cooling water of the cooling tower, the flow of the cooling water, the flow of the cooling water entering the hot water system, the flow of the cooling water of the cooling tower compensated by the hot water, the ambient wet bulb temperature, and the ambient air enthalpy corresponding to different total power consumptions of the cooling towers, and determining the load factor of the cooling tower, so as to establish a database;
   retrieving the load factor of the cooling tower, the ambient wet bulb temperature, the ambient air enthalpy, the number of the activated chillers, the number of the activated cooling towers, and the outlet temperature of the cooling water from the database to act as control variables for developing the model, and selecting a corresponding total power consumption of the cooling waters as an output result of the model; and
   developing the evaluating model for the total power consumption of the cooling tower.

16. The method of evaluating the performance of the chiller system as claimed in claim 15, further comprising a step of developing an evaluating model for the load factor of the cooling tower by taking variables of the inlet temperature of the cooling water of the cooling tower, a total flow of the cooling water flowing out from the chiller system, a compensation volume for the cooling water compensated from the hot water system, and a compensation volume of the cooling water entering the hot water system as control parameters, so as to determine the load factor of the cooling tower.

17. The method of evaluating the performance of the chiller system as claimed in claim 15, wherein the step of developing the evaluating model for the load factor of the cooling tower comprises:
   retrieving the total power consumption of the chillers, a load of the chiller, a cooling load of the chiller system, the inlet temperature of the cooling water of the cooling tower, the outlet temperature of the cooling water of the cooling tower, a load of the hot water system, the ambient wet bulb temperature, and the ambient air enthalpy, so as to determine the corresponding load factor of the cooling tower;
   retrieving the total power consumption of the chillers, the load of the chiller, the cooling load of the chiller system, the inlet temperature of the cooling water of the cooling tower, the outlet temperature of the cooling water of the cooling tower, the load of the hot water system, the ambient wet bulb temperature, and the ambient air enthalpy to act as control variables for developing the model, and selecting a corresponding load factor of the cooling tower as an output result of the model; and
   developing the evaluating model for the load factor of the cooling tower.

* * * * *